April 8, 1969     R. D. JONES     3,437,985
FLEXIBLE BUS-BAR CLAMP

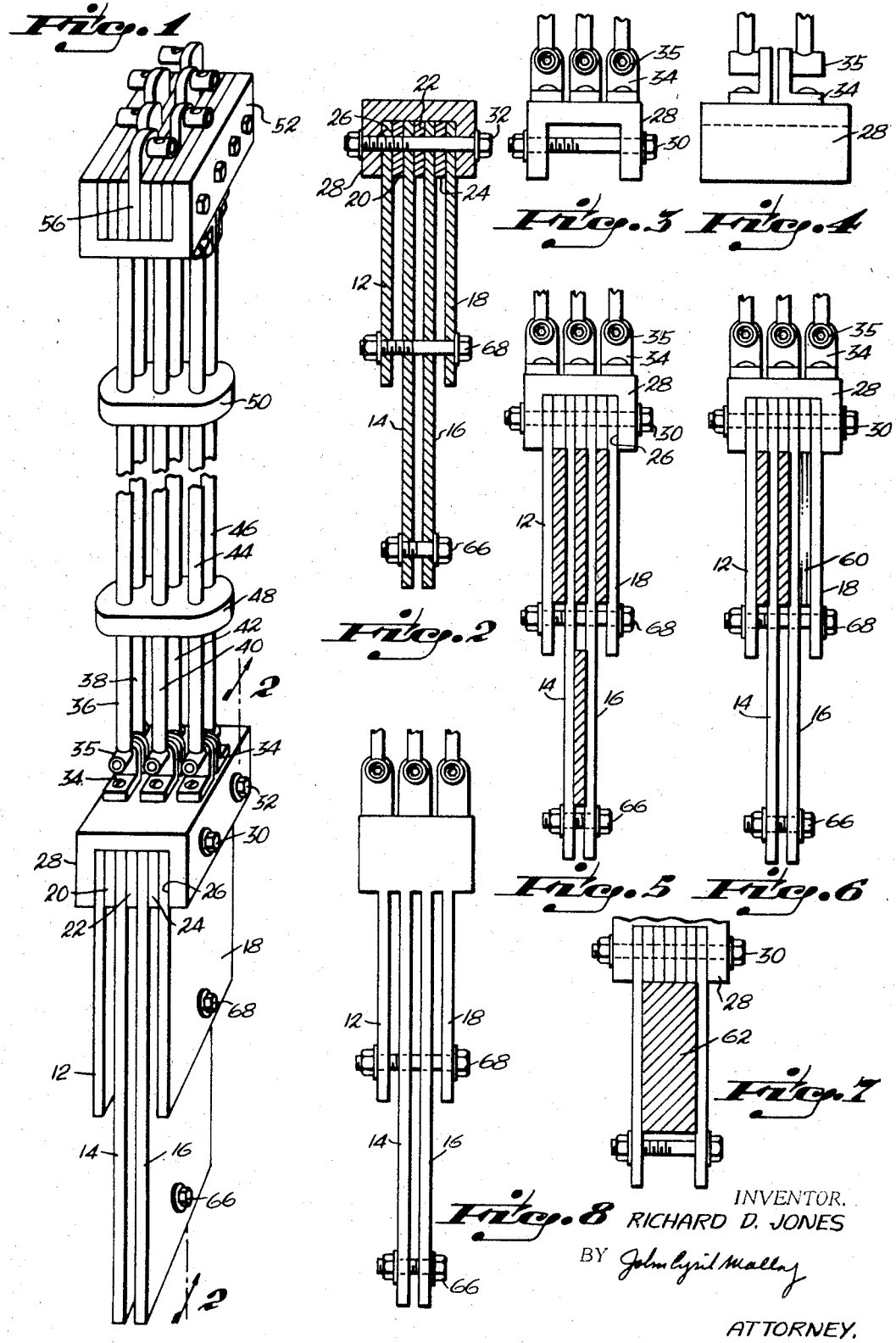

Filed Nov. 3, 1966     Sheet 2 of 3

INVENTOR.
RICHARD D. JONES
BY *John Cyril Malloy*
ATTORNEY.

INVENTOR.
RICHARD D. JONES

ATTORNEY.

United States Patent Office 3,437,985
Patented Apr. 8, 1969

3,437,985
FLEXIBLE BUS-BAR CLAMP
Richard D. Jones, 14851 Lewis Road,
Miami Lakes, Fla. 33012
Filed Nov. 3, 1966, Ser. No. 591,869
Int. Cl. H01r 13/24, 9/00, 7/08
U.S. Cl. 339—242
7 Claims

ABSTRACT OF THE DISCLOSURE

A bus-bar clamp and flexible cable for tapping into an electrical bus-bar, wherein the clamp comprises a plurality of equi-distantly spaced, flat connector plates electrically and mechanically interconnected at one end, whereat they interconnect with the electrical cable, the plates defining spaces, open at one end, within which bus-bars of a bus conductor are interfittingly received, and clamp means in the form of a through bolt provided at the free ends of the plates for clamping them in place with respect to the bus conductors received within the recesses.

This invention relates to a flexible bus-bar clamp and, more particularly, to a bus-bar clamp having a plurality of members adapted to inter-engage with bus-bars which are connected by flexible conductors to a secondary connector means to connect to conductors from a power source.

This invention is of a flexible bus-bar clamp which is adapted to be connected to existing bus-bars in an existing switchboard or any existing bus that is exposed for tapping power without drilling or disturbing the existing bus.

By use of the instant invention power can be tapped from the existing bus for any type of temporary electrical hook-up which might be needed and by this means electrical tying may be made with an emergency or normal bus together by using a generator or outside power separately. For instance, adding load that is normally not on the generator, like air conditioning, electric motors, lighting or any other power that may be of a normal bus, often requires such tying.

Also, the tying is often required for slowly adding a load to generator sets by operating individual switches on the normal bus and slowly adding load to the emergency bus so that the generators can run close to their capacity. Further, in the event that a main breaker needs or requires repairs or goes out for one reason or another, a replacement breaker can be obtained so long as it is the same voltage and the amperage does not exceed the carrying capacity for placement in front of the board and by use of the instant clamps it is possible to make a quick and easy connection from the existing breaker bus to the replacement breaker so that it can operate until the proper breaker is repaired or a new one installed. It will be apparent that the structure set forth hereinafter is ideal for long power outages; that is, a portion of the normal power can be carried by inserting these clamps.

It is, accordingly, an object of this invention to provide a simple and inexpensive flexible bus-bar clamp.

It is another object of this invention to provide a flexible bus-bar clamp which includes a plurality of equi-spaced plates of conductive material and means to hold the plates in said relation in clamping engagement with respect to bus-bars and connector means to connect the bus-bars between a first incoming connector means and the clamp in chief with the distance therebetween being bridged by flexible electrical cables.

It is another object of this invention to provide a flexible bus-bar of the type described hereinafter which is simple in construction, inexpensive to manufacture and is otherwise well adapted for the purposes for which it is intended.

In accordance with these and other objects which will become apparent hereinafter, the instant invention will now be described with reference to the accompanying drawings illustrating a preferred embodiment thereof.

In the drawings:

FIGURE 1 is a perspective view of the instant bus-bar clamp;

FIGURE 2 is a partial side elevation view taken along the plane indicated by the line 2—2 of FIGURE 1 and looking in the direction of the arrows;

FIGURE 3 is a partial view similar to that of FIGURE 2 and illustrating the upper portion of FIGURE 2;

FIGURE 4 is a side elevation view of FIGURE 3;

FIGURE 5 is a view in cross section taken similar to that of FIGURE 2 and illustrating the bus-bar clamp in engagement with a bus;

FIGURE 6 is an alternative means or arrangement of connection of the clamp to the bus;

FIGURE 7 is a view similar to FIGURES 5 and 6 and illustrating an alternative means of connection to a bus;

FIGURE 8 is a side elevation view of the lower portion of FIGURE 1;

Figure 10:
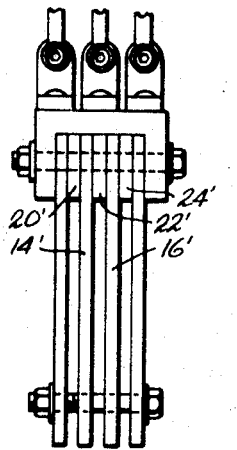
FIGURES 10, 11 and 12 are a modified version of the bus-bar clamp.
Figure 11:
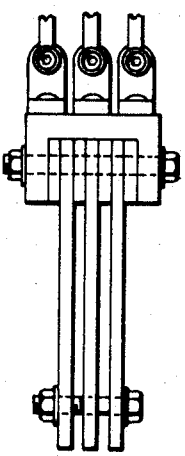
Figure 12:
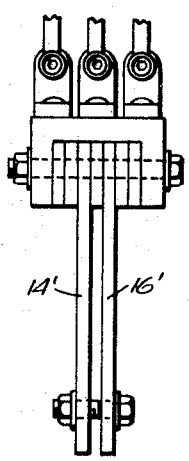

Referring to the drawings, wherein like reference characters designate like or corresponding parts throughout the different views, it will be seen upon reference to FIGURE 1 that there is shown a flexible bus-bar clamp which is composed of a plurality of equi-spaced plates 12, 14, 16 and 18 which are held in main surface abutting relation by means such as the spacers 20, 22 and 24 which are nested in the crotch 26 of a U-shaped member 28 and held securely therein by means of through bolts 30 and 32; said U-shaped frame 28 is provided with a plurality of upstanding lugs such as that designated by the numeral 34. Each of the said lugs includes a socket 35 to receive the extending unsheathed portion of an electrically insulated cable such as that designated by the numerals 36, 38, 40, 42, 44 and 46. The cables in turn are held in spaced-apart relation by spacer units 48 and 50 and the extending or distal-most ends of each of the cables are connected to a second series of lugs similar to those designated by the numeral 34 which, in the embodiment shown in FIGURE 1, are secured to an upper U-frame 52 and arranged as indicated to clasp the lug body extensions 56 and hold them in the attitude there shown. It will be seen on reference to FIGURE 5 that a bus-bar is adapted to be nested between the confronting faces of the plates or, in the alternative, as indicated in FIGURE 6, the unused spacer member or filler plate 60 may be provided. In the embodiment shown the individual plates are adapted to be removed and alternatively replaced by one bus-bar of an enlarged cross section as indicated in FIGURE 7 by the numeral 62. It is equally apparent that in lieu of the structure shown in FIGURES 1-7 the plates may be integral with the U-shaped frame so as to extend down in the equispaced relation referred to above. However, in this embodiment the individual plates are not adapted to be removed as in the preferred embodiment of FIGURES 1-7. With reference to FIGURES 10, 11 and 12, it will be seen that it is not necessary for the two intermediate plates 14′ and 16′ to extend the full distance shown in FIGURE 1; and, indeed, by altering the position of the particular spacer members which are designated by prime numerals and correspond to those designated by the numerals 20 to 24 in FIGURE 1, the clamp may be adapted to hold a varying number of buses.

Figure 13:
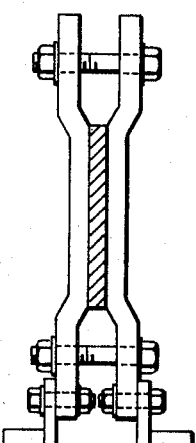
FIGURE 13 is a side elevation view of an alternative embodiment of the instant invention.
Figure 9:
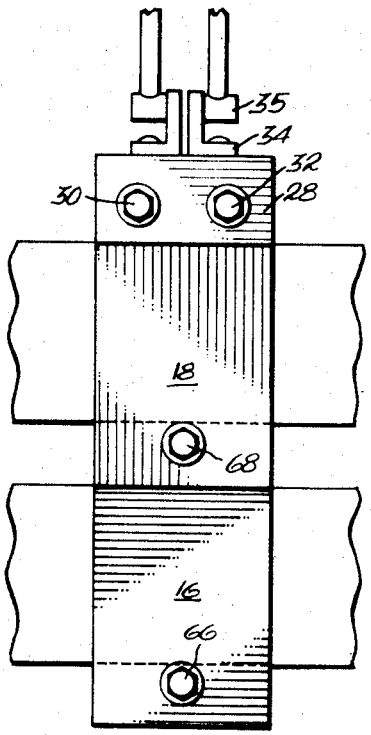
FIGURE 9 is a side elevation view of the device shown in FIGURE 8 connected to a bus.
Figure 14:
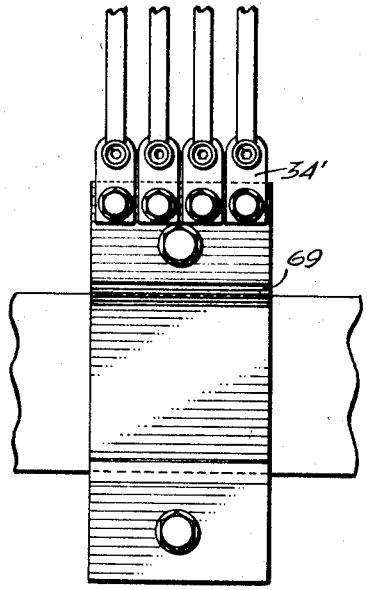
FIGURE 14 is an elevation view illustrating an alternative embodiment of the instant invention.
Figure 15:
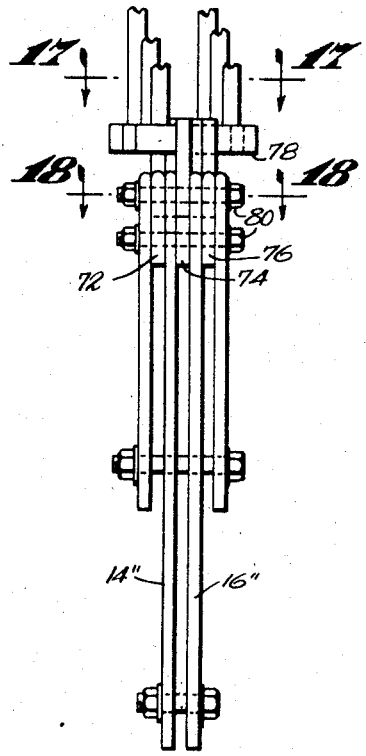
FIGURE 15 is a side elevation view of an alternative construction for the instant invention.
Figure 16:
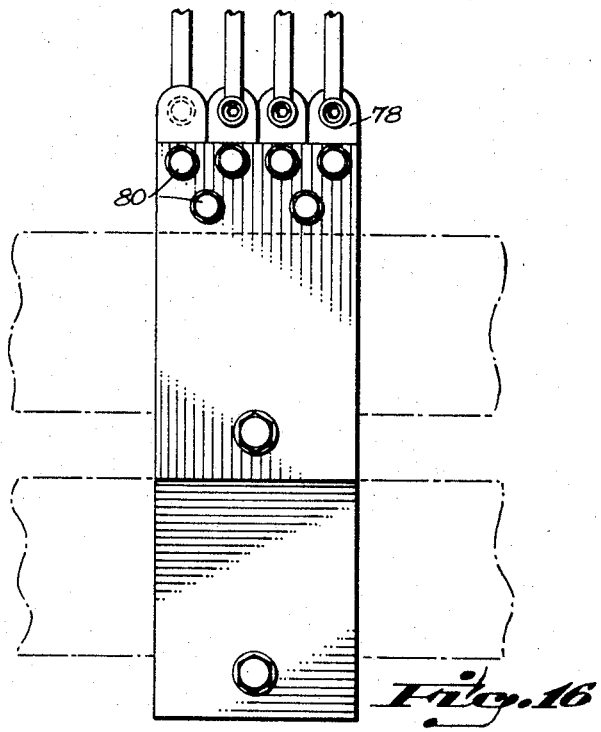
FIGURE 16 is a side elevation view of the embodiment shown in FIGURE 15.
Figure 17:
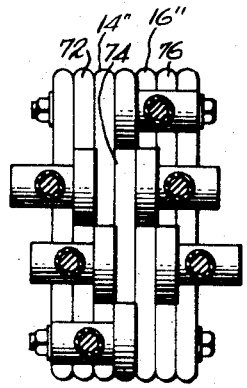
FIGURE 17 is a top plan view taken along the plane indicated by the line 17—17 of FIGURE 15 and looking in the direction of the arrows.
Figure 18:
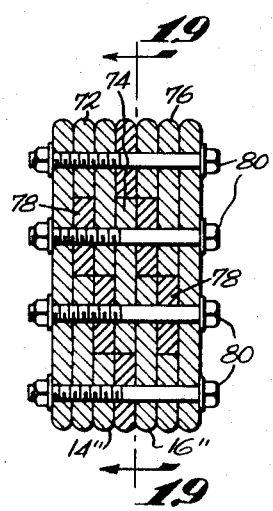
FIGURE 18 is a view in cross section taken along the plane indicated by the line 18—18 of FIGURE 15 and looking in the direction of the arrows.
Figure 19:
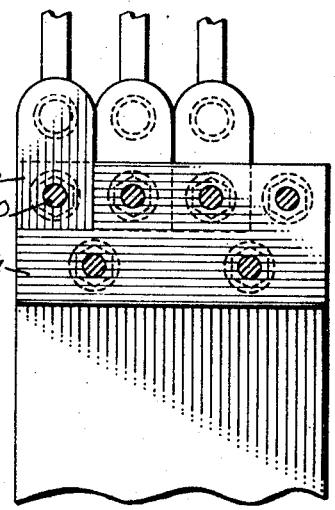
FIGURE 19 is a side elevation view, to illustrate the instant invention, the said view being taken along the plane indicated by the line 19—19 of FIGURE 18 and looking in the direction of the arrows.

The means for connecting and holding the bus-bars in sandwich relation between the plates is indicated in FIGURE 9 and as shown comprise the plurality of screws and nuts 66 and 68. It will be seen on reference to FIGURE 13 that an alternative arrangement for the plates may be utilized with the reversely bent intermediate section 69 providing reinforcement while at the same time permitting of the alternative type of connecting for the lugs 34′ to the plates. In the embodiment shown of FIGURE 1, it will be apparent that the particular bus-bar clamp invention of the instant application is adapted to be utilized to connect several plurality of busses together or, as is shown in FIGURE 13, to connect a bus in the lower end of the clamp and to an input power source at the upper end of the clamp.

Referring to FIGURES 15-19, an alternative arrangement of the instant invention is shown. In this embodiment the spacers designated by the numerals 72, 74 and 76 as well as the two central plates 14″ and 16″ each include a cut-away portion to receive and nest the base portion of the respective lugs 78 and it is thereby clamped together by the screws 80 so that it is not necessary in this embodiment to utilize a particular U-frame type of structure embodied in FIGURE 1 as the numeral 28 indicates.

What is claimed is:

1. A flexible bus bar clamp comprising; a plurality of equi-spaced plates of conductive material in main surface confronting relation; means of electrically conductive material to hold the plates in said relation to accommodate a plurality of bus bars with one bar between each confronting pair of main surfaces of the plates; a plurality of flexible electrical cables of a common length; first connector means to electrically connect each cable to the plates; and second connector means on the other ends of the cables to connect the cables to leads from a source, said means to electrically hold the plates in said relation comprising a U-shaped member having a first leg and a second leg extending in a common direction from the edges of a web portion and defining a cradle with said plates being secured in said cradle and spaced from one another by spacer members disposed in the cradle between the plates, and said plates, spacer members and legs having aligned holes defining a passage therethrough and a through bolt in the passage and mating nut means to hold the spacer members and plates between the legs of the U-shaped members so that a bus bar may be nested in electrical contact between the plates.

2. A device as set forth in claim 1 wherein the projecting ends of said plates are provided with aligned holes to accommodate a through bolt and nut means to tightly hold a bus-bar between the plates.

3. A flexible bus-bar clamp comprising; a plurality of equi-spaced plates of conductive material in main surface confronting relation; means of electrically conductive material to hold the plates in said relation to accommodate a plurality of bus-bars with one bar between each confronting pair of main surfaces of the plates; a plurality of flexible electrical cables of a common length; first connector means to electrically connect each cable to the plates; and second connector means on the other ends of the cables to connect the cables to leads from a source, said means to hold the plurality of spaced plates comprising spacer members between the plates and recesses in a common edge of the plates and said first connector member comprising a plurality of lugs and each said lug having a depending portion sized for snug receipt in said recesses and a plurality of aligned holes arranged through said spacer members and plates and depending portions of said lugs and a through bolt and nut means to hold each said depending portion of each lug in its respective recess.

4. A bus-bar clamp comprising a plurality of equi-distantly-spaced, electrically-conductive, flat plates defining spaces therebetween for the reception of a complementary plurality of electrical bus-bar conductors, electrically conductive spacer means at and between common end portions of said conductive plates for retaining them in spaced relation and providing for their electrical interconnection, connecting means positioned adjacent to said common end portions to make electrical connection between a plurality of flexible electrical cables and said conductive plates, and independently releasable clamp means for squeezing the opposite free ends of said plates into clamping engagement with respect to a plurality of bus-bar conductors received within said spaces for effecting temporary mechanical and electrical interconnection therewith.

5. A bus-bar clamp as defined in claim 4 wherein said clamp means comprises aligned, transverse openings in the free end portions of said plate, and bolt means receivable through said openings.

6. A bus-bar clamp as defined in claim 4 wherein said connecting means comprises a plurality of electrical connector lugs, said plurality of flexible electrical cables connected at one end to one each of said lugs, and connector means at the other ends of said cables for interconnection in a power circuit.

7. A bus-bar clamp as defined in claim 6 wherein a mutually spaced sub-plurality of said plates extends outwardly beyond the remainder of said plates for the reception therebetween of second bus-bar conductors in outwardly spaced relation with respect to said first-mentioned plurality of bus-bar conductors.

References Cited

UNITED STATES PATENTS

| | | | |
|---|---|---|---|
| 1,557,248 | 10/1925 | Gernsback | 339—242 X |
| 1,979,090 | 10/1934 | Alsaker et al. | 174—129 X |
| 2,084,580 | 6/1937 | Frank | 339—22 X |
| 2,097,324 | 10/1937 | Hill | 339—22 X |
| 2,122,298 | 6/1938 | Scott | 174—129 X |
| 3,212,046 | 10/1965 | Abel et al. | 339—263 X |

FOREIGN PATENTS

| | | |
|---|---|---|
| 149,340 | 12/1952 | Australia. |
| 123,336 | 6/1931 | Austria. |
| 551,633 | 4/1923 | France. |
| 746,180 | 3/1956 | Great Britain. |

MARVIN A. CHAMPION, *Primary Examiner.*

P. TEITELBAUM, *Assistant Examiner.*

U.S. Cl. X.R.

174—72; 248—63; 339—198, 263